United States Patent
Stuby, Jr.

(10) Patent No.: US 9,974,143 B2
(45) Date of Patent: May 15, 2018

(54) LIGHT SENSOR ASSEMBLY HAVING WIRELESS DATA TRANSFER

(71) Applicant: TYCO ELECTRONICS CORPORATION, Berwyn, PA (US)

(72) Inventor: Richard G. Stuby, Jr., New Tripoli, PA (US)

(73) Assignee: TE CONNECTIVITY CORPORATION, Berwyn, PA (US)

(*) Notice: Subject to any disclaimer, the term of this patent is extended or adjusted under 35 U.S.C. 154(b) by 0 days. days.

(21) Appl. No.: 15/278,762

(22) Filed: Sep. 28, 2016

(65) Prior Publication Data
US 2018/0092186 A1  Mar. 29, 2018

(51) Int. Cl.
| | |
|---|---|
| H05B 37/02 | (2006.01) |
| H05B 39/04 | (2006.01) |
| H05B 41/36 | (2006.01) |
| H01R 13/66 | (2006.01) |
| G01J 1/42 | (2006.01) |
| G01J 1/44 | (2006.01) |
| F21S 8/08 | (2006.01) |
| F21W 131/103 | (2006.01) |

(52) U.S. Cl.
CPC ........ *H05B 37/0218* (2013.01); *G01J 1/4204* (2013.01); *G01J 1/44* (2013.01); *H01R 13/6683* (2013.01); *H01R 13/6691* (2013.01); *H05B 37/0227* (2013.01); *H05B 37/0272* (2013.01); *F21S 8/086* (2013.01); *F21W 2131/103* (2013.01)

(58) Field of Classification Search
CPC ............ H05B 37/0218; H05B 37/0227; H05B 37/0272; G01J 1/4204; G01J 1/44; H01R 13/6683; H01R 13/6691; F21W 2131/103
USPC .......................................... 315/158, 133, 294
See application file for complete search history.

(56) References Cited

U.S. PATENT DOCUMENTS

| | | | |
|---|---|---|---|
| 2011/0060701 A1 | 3/2011 | Verfuerth et al. | |
| 2012/0037725 A1* | 2/2012 | Verfuerth | A01G 25/16 239/289 |
| 2012/0139426 A1* | 6/2012 | Ilyes | F21V 23/02 315/152 |
| 2015/0097489 A1* | 4/2015 | Wu | H05B 33/0827 315/122 |

(Continued)

FOREIGN PATENT DOCUMENTS

WO 2016060902 A1 4/2016

OTHER PUBLICATIONS

International Search Report, Application No. PCT/IB2017/055532, International Filing Date, Sep. 13, 2017.

*Primary Examiner* — Daniel D Chang

(57) ABSTRACT

A light sensor assembly includes a photocontrol receptacle connector configured to be mounted to a housing, such as of a light fixture. The receptacle connector has a mating interface for mating with a photocontrol sensor connector. The receptacle connector holds contacts at the mating interface for electrical connection with corresponding contacts of the photocontrol sensor connector for controlling the light fixture. The contacts are configured to be electrically connected to power wires of the light fixture. The receptacle connector includes a receptacle connector communication device for wireless communication with the photocontrol sensor connector.

21 Claims, 2 Drawing Sheets

(56) References Cited

U.S. PATENT DOCUMENTS

| | | | | |
|---|---|---|---|---|
| 2015/0124100 A1* | 5/2015 | McRory | ............... | H04N 7/185 |
| | | | | 348/151 |
| 2015/0282282 A1 | 10/2015 | Breuer et al. | | |
| 2016/0047537 A1* | 2/2016 | Stolte | ............... | F21V 23/0435 |
| | | | | 362/276 |
| 2016/0103016 A1* | 4/2016 | Weber | ............... | G01J 1/0448 |
| | | | | 250/227.11 |

\* cited by examiner

LIGHT SENSOR ASSEMBLY HAVING WIRELESS DATA TRANSFER

BACKGROUND OF THE INVENTION

The subject matter herein relates generally to outdoor lighting control.

On outdoor lighting, notably street lights and parking lot lights, photocontrol components and the corresponding mating receptacles are typically used to turn the lights on and off based upon the ambient light from the sun. Some light fixtures support dimming to variably control the light fixture based on the ambient light levels, time of day. There is a trend to provide programmable functions to the light fixtures based on sensors and programmable controls other than ambient light, such as, detected nearby pedestrian motion. To accommodate these functions, the lighting control receptacles provide additional signaling contacts at the interface between the photocontrol component and the receptacle component mounted to the housing of the light fixture. However, the area available on the components for such signaling contacts is small due to standard arrangement of contacts supporting twist-lock interconnection. Additionally, alignment of the contacts is difficult due to the twist-lock arrangement between the sensor component and the receptacle component. Wired connections are impractical because of the twist-lock arrangement between the sensor component and the receptacle component. Additionally environmental sealing complicates the design.

A need remains for a light sensor assembly that allows data communication between photocontrol sensor components and the receptacle components of light fixture photocontrol sensors.

BRIEF DESCRIPTION OF THE INVENTION

In one embodiment, a light sensor assembly is provided including a photocontrol receptacle connector configured to be mounted to a housing of a light fixture. The receptacle connector has a mating interface for mating with a photocontrol sensor connector. The receptacle connector holds contacts at the mating interface for electrical connection with corresponding contacts of the photocontrol sensor connector for controlling the light fixture. The contacts are configured to be electrically connected to power and/or signal wires of the light fixture. The receptacle connector includes a receptacle connector communication device for wireless communication with the photocontrol sensor connector.

In another embodiment, a light sensor assembly is provided including a photocontrol receptacle connector and a photocontrol sensor connector. The receptacle connector is configured to be mounted to a housing of a light fixture. The receptacle connector has a mating interface. The receptacle connector holds contacts at the mating interface. The contacts are configured to be electrically connected to power and/or signal wires of the light fixture. The receptacle connector includes a receptacle connector communication device for wireless communication. The sensor connector is mated to the receptacle connector at the mating interface. The sensor connector has contacts being electrically connected to the contacts of the receptacle connector. The sensor connector has a photocontrol component electrically connected to the contacts. The sensor connector includes a sensor connector communication device for wireless communication with the receptacle connector communication device across the mating interface.

In a further embodiment, a light sensor assembly is provided including a photocontrol receptacle connector and a photocontrol sensor connector. The photocontrol receptacle connector is configured to be mounted to a housing of a light fixture. The receptacle connector has a mating interface. The receptacle connector includes a receptacle connector communication device for wireless communication. The photocontrol sensor connector is mated to the receptacle connector at the mating interface. The sensor connector has a photocontrol component for sensing an ambient light level exterior of the sensor connector. The sensor connector includes an environmental sensor for sensing an environmental characteristic in the environment exterior of the sensor connector. The sensor connector includes a sensor connector communication device receiving signals from at least one of the photocontrol component and the environmental sensor. The sensor connector communication device wirelessly communicates data or control signals based on the received signals with the receptacle connector communication device across the mating interface. A control circuit is communicatively coupled to the receptacle connector communication device. The control circuit receives the control signals from the receptacle connector communication device.

DETAILED DESCRIPTION OF THE INVENTION

Figure 1:
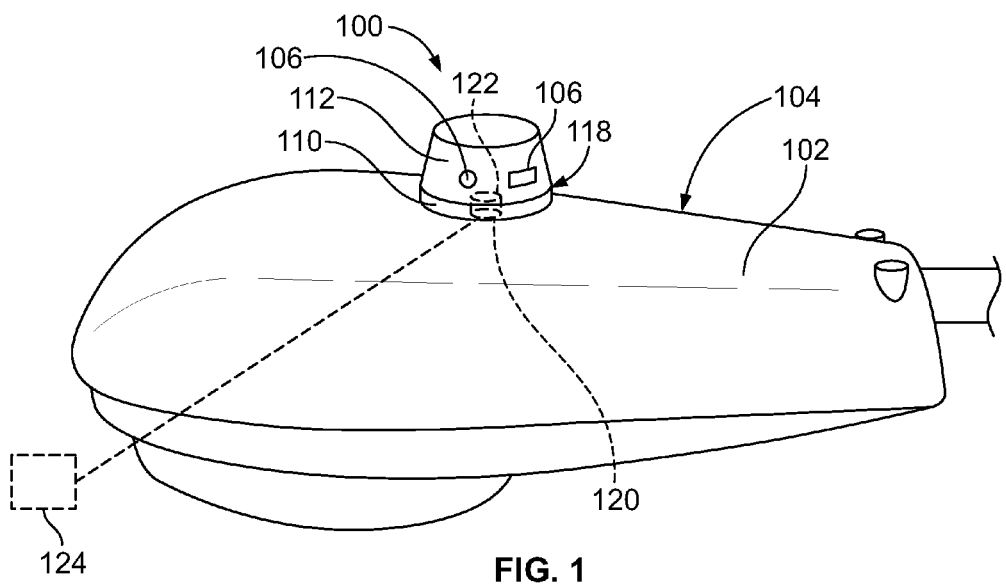
FIG. 1 illustrates a light sensor assembly formed in accordance with an exemplary embodiment.

FIG. 1 illustrates a light sensor assembly 100 formed in accordance with an exemplary embodiment. The light sensor assembly 100 is mounted to a housing 102, such as a housing of a light fixture 104, such as a roadway light, a parking lot light, a street light, and the like, or to another component, such as the pole or other structure supporting the light fixture 104, or to another component unassociated with the light fixture, such as a parking meter, a telephone pole or another structure. The light sensor assembly 100 holds one or more sensors or photocontrol components 106 that is/are used to control the light fixture 104, such as for turning the light fixture on or off depending upon light levels, for dimming control of the light fixture, or for controlling other functions. The photocontrol components 106 may be used for other functions other than controlling the light fixture 104, such as remote monitoring of the environmental surroundings of the housing 102, such as for parking monitoring, for street flow activity monitoring, or other functions. The photocontrol components 106 may be a photocell or light sensor used to detect ambient light from the sun. Other types of photocontrol components 106 such as object identification sensors, motion sensors, timing sensors and the like may be included in the light sensor assembly.

The light sensor assembly 100 includes a receptacle connector 110 that forms the bottom of the assembly 100. The receptacle connector 110 may be directly mounted to the housing 102 of the light fixture 104 or may be mounted to another component on the housing 102. The light sensor assembly 100 includes a sensor connector 112 coupled to the receptacle connector 110. The sensor connector 112 houses or surrounds the photocontrol component 106, such as to provide environmental protection for the photocontrol component 106. In an exemplary embodiment, the receptacle connector 110 is a twist-lock photocontrol receptacle connector 110 and the sensor connector 112 is a twist-lock photocontrol sensor connector 112, such as connectors 110, 112 being ANSI C136.x compliant. The connectors 110, 112 include contacts 114, 116 (shown in FIG. 2), respectively, at a mating interface 118. For example, the contacts 114, 116 may be twist-lock contacts. The contacts 114, 116 may be high voltage power contacts. Other types of contacts may be provided at the mating interface for a direct, physical electrical connection across the mating interface 118 between the connectors 110, 112. The connectors 110, 112 may be other types of connectors other than twist-lock connectors. The connectors 110, 112 may include other types of contacts 114, 116 other than twist-lock contacts or may not include any contacts but rather be contactless connectors.

In an exemplary embodiment, the receptacle connector 110 includes a receptacle connector communication device 120 for contactless and wireless communication with the sensor connector 112. The sensor connector 112 includes a sensor connector communication device 122 for contactless and wireless communication with the receptacle connector 110. The communication devices 120, 122 communicate wirelessly therebetween, such as through digital wireless signals, infrared signals, capacitive communication, inductive communication or by other types of contactless and wireless communication. Data may be transmitted from the sensor connector 112 to the receptacle connector 110, or vice versa, across the mating interface 118 without the need for contacts or wires between the communication devices 120, 122. Optionally, the receptacle connector communication device 120 and/or the sensor connector communication device 122 may be configured to communicate wirelessly with a remote communication device 124 remote from the light fixture 104, such as on the ground or to a central communication location for control of the light fixture 104 and/or for monitoring the environment around the light fixture 104, such as pedestrian traffic, vehicle traffic, parking, or other environmental factors.

Figure 2:
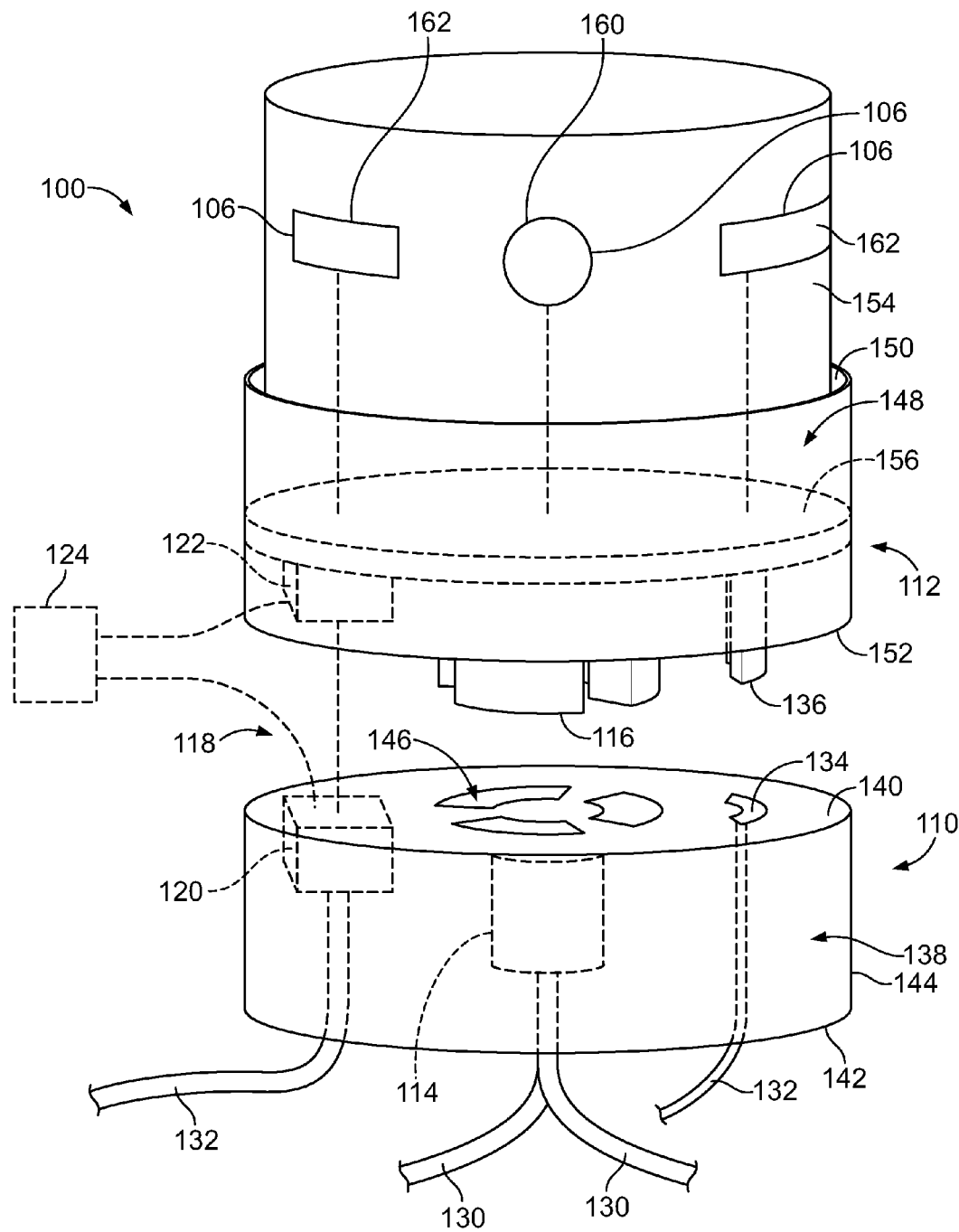
FIG. 2 is a schematic view of the light sensor assembly formed in accordance with an exemplary embodiment showing a sensor connector and a receptacle connector.

FIG. 2 is a schematic view of the light sensor assembly 100 formed in accordance with an exemplary embodiment showing the sensor connector 112 poised for mating with the receptacle connector 110. The connectors 110, 112 hold the contacts 114, 116 and the communication devices 120, 122. Optionally, a seal (not shown) may be provided between the receptacle connector 110 and the sensor connector 112 to seal the light sensor assembly 100 from environmental containments such as water, debris, and the like.

The light sensor assembly 100 may include power wires 130 extending from the receptacle connector 110. The power wires 130 are terminated to corresponding power contacts 114. The power wires 130 may be power in or power out wires bring power to the light sensor assembly 100 from a power source or bringing power from the power contacts 114 to another component, such as the light or a driver board for the light of the light fixture 104. In other various embodiments, the light sensor assembly 100 does not include the power wires 130 extending to/from the receptacle connector 110, but rather the power wires 130 may extend to other components in the light fixture 104.

The light sensor assembly 100 may additionally or alternatively include signal wires 132 extending from the receptacle connector 110. The signal wires 132 may be electrically connected to the receptacle connector communication device 120. The signal wires 132 may be electrically connected to other components, such as signal contacts 136 of the receptacle connector 110. The signal wires 132 may transmit data to or from the receptacle connector communication device 120 for data communication with the sensor connector 112. The signal wires 132 may be electrically connected to one or more other components, such as a control module for controlling the operation of the light fixture 104 or other functions.

Optionally, as in the illustrated embodiment, the receptacle connector 110 may include signal contacts 134 at the mating interface 118 for electrical connection to corresponding signal contacts 136 of the sensor connector 112. The signal contacts 134, 136 are directly mated together at the mating interface 118. The signal wires 132 are terminated to corresponding signal contacts 134. The signal contacts 134 transmit different data signals than the communication devices 120, 122. Providing the contactless, wireless data link between the connectors 110, 112 using the communication devices 120, 122 allows additional data to be transmitted across the mating interface 118. In various embodiments, such as when the signal contacts 134, 136 are not provided, the wireless data link between the connectors 110, 112 using the communication devices 120, 122 provides the only data link between the connectors 110, 112. For example, all data and/or control signals from the sensor connector 112 may be communicated by the communication devices 120, 122 rather than by using dedicated signal contacts, such as the signal contacts 134, 136.

The receptacle connector 110 includes a housing 138 extending between a top 140 and a bottom 142 opposite the top 140. The bottom 142 is configured to be secured to the fixture housing 102 or another component. The receptacle connector 110 includes a side wall 144 between the top 140 and the bottom 142. The housing 138 holds the contacts 114, signal contacts 134 and the communication device 120. Optionally, such components may be entirely contained within the housing 138 and protected from the environment by the housing 138. For example, the contacts 114 may be held in contact channels 146 within the housing 138. Optionally, the contact channels 146 are curved slots or openings in the housing 138 extending between the top 140 and the bottom 142. In an exemplary embodiment, the receptacle connector 110 is cylindrical shaped, such as to allow easy rotation of the sensor connector 112 relative to the receptacle connector 110. However, the receptacle connector 110 may have other shapes and alternative embodiments.

In an exemplary embodiment, the receptacle connector 110 includes at least one securing feature used to secure the sensor connector 112 relative to the receptacle connector 110. For example, the receptacle connector 110 may include a clip or a flange to secure the sensor connector 112 to the receptacle connector 110. The securing feature may allow rotation of the sensor connector 112 relative to the receptacle connector 110 when engaged. Other fastening methods that secure sensor connector 112 to the receptacle connector 110 may be employed, which may allow rotation of sensor connector 112 relative to receptacle connector 110. In other various embodiments, the interaction between the contacts 114, 116 is used to secure the sensor connector 112 to the receptacle connector 110.

The sensor connector 112 includes a housing 148 extending between a top 150 and a bottom 152 opposite the top 150. The bottom 152 may define the mating interface and is configured to be secured to the receptacle connector 110. In other embodiments, sides of the housing 148 or other securing features may be secured to the receptacle connector 110. In an exemplary embodiment, the sensor connector 112 includes a sensor lid 154 at the top 150 of the housing 148. The sensor lid 154 may be rotatably coupled to the housing 148, such as to allow positioning of the photocell relative to the light fixture 104 (e.g., to direct the photocell in a north direction to receive diffuse ambient light). In other various embodiments, the photocell may be provided at the top 150 such that rotation of the sensor lid 154 is unnecessary. In an exemplary embodiment, the receptacle connector 110 is cylindrical shaped, such as to allow easy rotation of the sensor connector 112 relative to the receptacle connector 110, such as during mating. However, the receptacle connector 110 may have other shapes and alternative embodiments.

The housing 148 holds the contacts 116, the signal contacts 136 and the communication device 122. The housing 148 may hold the sensor(s) 106. In an exemplary embodiment, the housing 148 holds a circuit board 156 and various components are mounted to the circuit board 156. For example, the contacts 116, signal contacts 136, communication device 122 and/or the photocontrol components 106 may be mounted to the circuit board 156. The contacts 116 and the signal contacts 136 may extend from the bottom 152 for mating with the contacts 114 and the signal contacts 134, respectively, of the receptacle connector 110 and may be arranged generally around a central axis, however the contacts 114 and/or 134 may be at different locations in alternative embodiments. Optionally, the contacts 116 may be curved and fit in the curved contact channels 146 in the receptacle connector 110 to mate with corresponding curved power contacts 114. In an exemplary embodiment, the sensor connector 112 may be twisted or rotated to lock the contacts 116 in the receptacle connector 110, such as in electrical contact with the contacts 114. For example, the contacts 116 may be twist-lock contacts that are initially loaded into the contact channels 146 in a vertical direction and the sensor connector 112 is then rotated, such as approximately 35 degrees, to lock the contacts 116 in the connector 110. Other types of mating arrangements between the contacts 116 and the connector 110 are possible in alternative embodiments.

In an exemplary embodiment, the sensor connector 112 includes different types of photocontrol components 106 for sensing different events. For example, the sensor connector 112 includes a photocell 160. The photocell 160 is used for sensing ambient light and is used to control operation of the light fixture 104, such as for turning the light fixture 104 on or off depending upon light levels or for dimming control of the light fixture 104. Optionally, the photocell 160 may be mounted to the circuit board 156. Alternatively, the photocell 160 may be mounted in the sensor lid 154 and aim-able by rotating the sensor lid 154 relative to the housing 148. In other various embodiments, the photocell 160 may be mounted to the sensor lid 154 and connected to the circuit board 156 by one or more wires or contacts. The contacts 114 and photocell 160 may be electrically connected via the circuit board 156. In other alternative embodiments, the contacts 114 may be connected to the photocell 160 via wires. The circuit board 156 may include additional componentry for signal conditioning. For example, the circuit board 156 may have control circuitry for controlling operation of the light fixture 104, such as including a daylight or nighttime control circuit, a timer circuit, a dimming circuit, and the like. Data from the photocell 160 may be transmitted through the signal contacts 134, 136 across the mating interface 118. Alternatively, data from the photocell 160 may be transmitted through the contactless, wireless communication devices 120, 122 across the mating interface 118 for control of the light fixture 104.

In an exemplary embodiment, the sensor connector 112 includes one or more environmental sensor 162 for sensing an environmental characteristic other than ambient light exterior of the sensor connector 112 in the environment exterior of the sensor connector 112. For example, the sensor 162 may be a motion sensor or an object sensor configured to sense movement or presence of an object, such as a person or vehicle in a particular area. The sensor 162 may be used for parking monitoring, for street flow activity monitoring, for pedestrian monitoring, or other functions. The sensor 162 may be mounted to the circuit board 156. In an exemplary embodiment, the sensor 162 is electrically connected to the sensor connector communication device 122. The communication device 122 receives signals from the environmental sensor 162 and wirelessly communicates control signals based on the received signals from the environmental sensor 162 with the receptacle connector communication device 120 across the mating interface 118. In various other embodiments, data from the environmental sensor(s) 162 may be transmitted through the signal contacts 134, 136 across the mating interface 118.

In an exemplary embodiment, the communication devices 120, 122 are transceivers configured for two-way communication. For example, data relating to signals from the photocontrol components 160, 162 may be transmitted from the sensor connector communication device 122 and received by the receptacle connector communication device 120. The communication devices 120, 122 may transmit data relating to light levels, dimming control of the light fixture 104, or other environmental information about the environment around the light fixture 104. Additionally, the receptacle connector communication device 120 transmits data, such as identifying metadata about the receptacle connector 110 and/or health of the light fixture 104 such as information relating to the hours of operation of the light fixture, if the light is burnt out, and the like, to the sensor connector 112. The identifying metadata may be a serial number, location coordinates or other metadata associated with the receptacle connector 110 and/or the light fixture 104. The metadata may be independent of the sensor data. Such information may be used by the sensor connector 112. For example, the metadata may be used to control operation of the photocontrol components 106, such as timing or control of operation, the sensor connector 112 may communicate directly with the remote communication device 124 and may transmit the metadata with the sensor data to the remote communication device 124, or the metadata may be used for other purposes by the sensor connector 112. The metadata may be communicated by the communication devices 120, 122.

In other various embodiments, rather than providing two-way communication, the communication devices 120, 122 may be operated to transmit data only from the sensor connector communication device 122 to the receptacle connector communication device 120. For example, the communication device 120 may be a receiver and the communication device 122 may be a transmitter. In other various embodiments, the communication devices 120, 122 may be operated to transmit data only from the receptacle connector communication device 120 to the sensor connector communication device 122. For example, the communication device 122 may be a receiver and the communication device 120 may be a transmitter.

In an exemplary embodiment, the communication devices 120, 122 communicate wirelessly therebetween through digital wireless signals or other types of wireless signals. For example, the communication devices 120, 122 may communicate using RF wireless communication, near-field communication (NFC), RFID, Bluetooth low energy (BLE) communication, ZigBee communication, RuBee communication, magnetic communication and the like. The communication devices 120, 122 may communicate using capacitive coupling, inductive coupling or electromagnetic fields. The communication devices 120, 122 may be closely aligned for efficient coupling. The communication devices 120, 122 may communicate using line-of-sight wireless communication, such as optical communication including infrared communication or communication using other visible or invisible light spectrums.

In an exemplary embodiment, multiple sensor connector communication devices 122 may communicate with one or more receptacle connector communication devices 120. Multiple receptacle connector communication devices 120 may communicate with one or more sensor connector communication devices 122. Optionally, any of the communication devices 120, 122 may communicate with another communication device, such as the remote communication device 124. The remote communication device 124 may be part of a hand-held device on the ground held by an operator. The remote communication device 124 may be a central station monitoring data from multiple light fixtures. The remote communication device 124 may transmit data to the communication device 122 (or the communication device 120) for remote control of the light fixture 104.

In an exemplary embodiment, the smart sensor connector 112 having the enhanced sensor capability is backwards compatible with conventional 3-contact ANSI C136.x receptacles and with 4-7 contact ANSI receptacles. Optionally, providing the communication devices 120, 122 in the connectors 110, 112 may replace some or all of the 1-4 low voltage signal contacts of conventional ANSI receptacles; however, the communication devices 120, 122 in the connectors 110, 112 may be used in addition to the low voltage signal contacts of conventional ANSI receptacles to enhance the amount or type of data being transmitted between the connectors 110, 112. The communication devices 120, 122 may be designed and positioned in the connectors 110, 112 to be aligned when the twist-lock connectors 110, 112 are mated; however, in some embodiments, the communication devices 120, 122 do not need to be aligned and can operate at any location within the connectors 110, 112. The communication devices 120, 122 may be designed to communicate with digital multiplexing capabilities or digital packet protocols for enhanced data transfer. The signals transmitted to-from the communication devices 120, 122 may be converted to DALI compliant levels or may be converted to 0-10V (standard) compliant levels. The connections to the communication devices, such as to the sensors 160, 162 or to the wires 132 may be through wires, terminals, connectors, printed circuit board connections, and the like.

Figure 3:
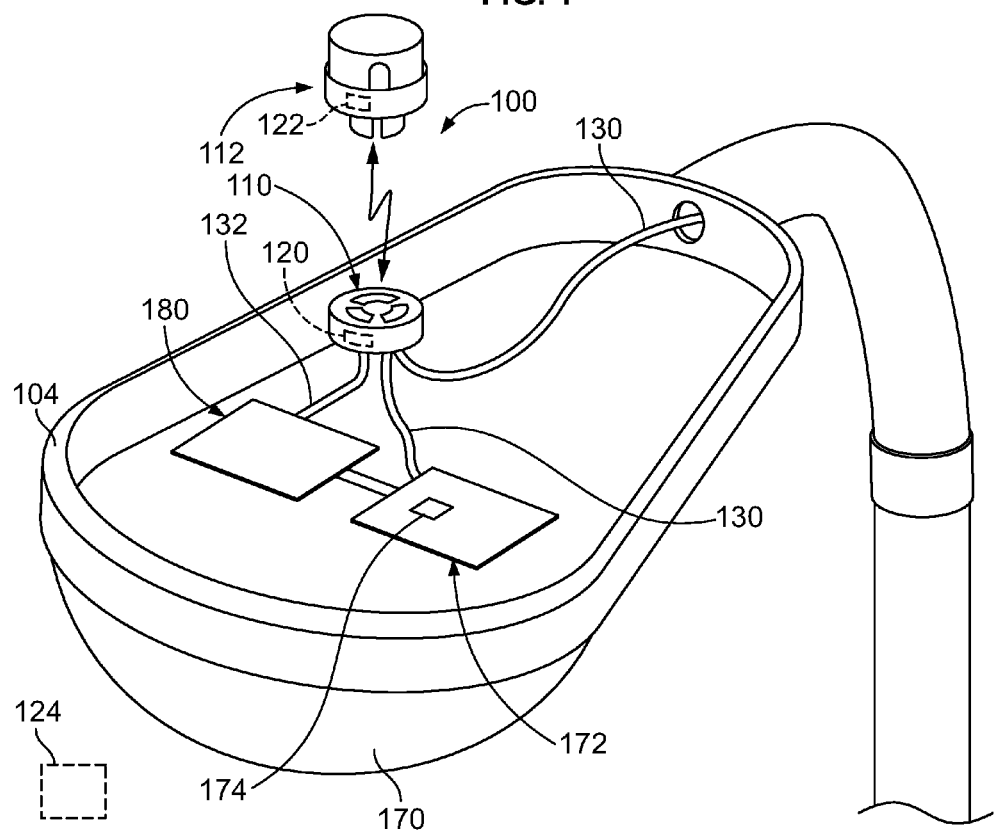
FIG. 3 is a schematic view of the light sensor assembly within a light fixture.

FIG. 3 is a schematic view of the light sensor assembly 100 within the light fixture 104. The light fixture 104 includes a light 170. The light 170 is powered by the power wires 130. For example, the power wires 130 are connected to a power management circuit 172. The power wires 130 extend to/from the receptacle connector 110 and may be electrically connected to the contacts 114 (shown in FIG. 2). The power management circuit 172 includes circuitry for supplying power to the light 170. The power management circuit 172 may include a power driver circuit board. The power management circuit 172 may include a switch 174 for switching the power on or off. Optionally, the power management circuit 172 may control dimming of the light 170, such as by controlling the power to the light 170.

In an exemplary embodiment, the light sensor assembly 100 includes a control circuit 180. The control circuit 180 controls the power management circuit 172. For example, the control circuit 180 may control operation of the switch 174. The control circuit 180 may be connected to the power management circuit 172 by wires. Alternatively, the control circuit 180 may be connected to the power management circuit 172 wirelessly. In other various embodiments, the control circuit 180 and the power management circuit 172 may be on the same circuit board and connected by traces.

The control circuit 180 receives inputs, such as from the connectors 110, 112 and provides outputs, such as to the power management circuit 172. The control circuit 180 is electrically connected to the signal wires 132, which are electrically connected to the receptacle connector communication device 120 and/or the signal contacts 134 (shown in FIG. 2). As such, the control circuit 180 receives data from the receptacle connector 110. The data may be used to control operation of the light fixture 104. The data may be used to control other functions. The data may be further transmitted to another communication device, such as the remote communication device 124, such as for parking or traffic monitoring. In other various embodiments, rather than being connected to the receptacle connector 110 by wires, the circuit board of the control circuit 180 may be integrated into the receptacle connector 110 or the receptacle connector 110 may be mounted directly to the circuit board of the control circuit 180. In other various embodiments, the communication device 120 may be mounted to the circuit board of the control circuit 180 remote from the receptacle connector 110 such that the sensor connector communication device 122 communicates directly with the communication device 120 on the circuit board of the control circuit 180.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

What is claimed is:

1. A light sensor assembly comprising:
a photocontrol receptacle connector configured to be mounted to a housing of a light fixture, the receptacle connector includes a receptacle connector housing, the receptacle connector having a mating interface for mating with a photocontrol sensor connector, the receptacle connector holding contacts at the mating interface for electrical connection with corresponding contacts of the photocontrol sensor connector for controlling the light fixture, the contacts configured to be electrically connected to power wires of the light fixture;
the receptacle connector including a receptacle connector communication device for wireless communication with the photocontrol sensor connector, the receptacle connector communication device in the receptacle connector housing.

2. The light sensor assembly of claim 1, wherein the receptacle connector communication device communicates wirelessly with a sensor connector communication device in the photocontrol sensor connector.

3. The light sensor assembly of claim 1, wherein the receptacle connector housing including contact channels holding the contacts.

4. The light sensor assembly of claim 1, wherein the receptacle connector communication device includes a transceiver.

5. The light sensor assembly of claim 1, wherein the receptacle connector communication device receives control signals from the photocontrol sensor connector for controlling operation of the light fixture.

6. The light sensor assembly of claim 1, wherein the receptacle connector communication device transmits identifying metadata to the photocontrol sensor connector.

7. The light sensor assembly of claim 1, wherein the receptacle connector further comprises at least one signal contact at the mating interface for interfacing with the photocontrol sensor connector, the receptacle connector communication device communicating different data across the mating interface than the at least one signal contact.

8. The light sensor assembly of claim 1, wherein the receptacle connector communication device provides digital multiplexing of data with the photocontrol sensor connector.

9. The light sensor assembly of claim 1, wherein the receptacle connector communication device is communicatively coupled to a control circuit for controlling operation of the light fixture.

10. The light sensor assembly of claim 1, wherein the receptacle connector communication device is configured to be one of capacitively coupled or inductively coupled to the photocontrol sensor connector across the mating interface.

11. The light sensor assembly of claim 1, wherein the receptacle connector communication device is configured to wirelessly communicate with the photocontrol sensor connector by infrared signals.

12. The light sensor assembly of claim 1, wherein the receptacle connector communication device is configured to wirelessly communicate with the photocontrol sensor connector by digital communication.

13. A light sensor assembly comprising:
a photocontrol receptacle connector configured to be mounted to a housing of a light fixture, the receptacle connector having a mating interface, the receptacle connector includes a receptacle connector housing, the receptacle connector holding contacts at the mating interface, the contacts configured to be electrically connected to power wires of the light fixture, the receptacle connector including a receptacle connector communication device for wireless communication, the receptacle connector communication device in the receptacle connector housing; and
a photocontrol sensor connector mated to the receptacle connector at the mating interface, the sensor connector having contacts being electrically connected to the contacts of the receptacle connector, the sensor connector having a photocontrol component electrically connected to the contacts, the sensor connector including a sensor connector communication device for wireless communication with the receptacle connector communication device across the mating interface.

14. The light sensor assembly of claim 13, wherein the sensor connector includes an environmental sensor for sensing an environmental characteristic other than ambient light exterior of the sensor connector in the environment exterior of the sensor connector, the sensor connector communication device receiving signals from the environmental sensor, the sensor connector communication device wirelessly communication control signals based on the received signals from the environmental sensor with the receptacle connector communication device across the mating interface.

15. The light sensor assembly of claim 13, wherein the sensor connector communication device is configured to communicate with a remote communication device remote from the light fixture.

16. The light sensor assembly of claim 13, wherein the receptacle connector communication device receives control signals from the photocontrol sensor connector for controlling operation of the light fixture.

17. The light sensor assembly of claim 13, wherein the receptacle connector communication device is communicatively coupled to a control circuit for controlling operation of the light fixture.

18. A light sensor assembly comprising:
a photocontrol receptacle connector configured to be mounted to a housing of a light fixture, the receptacle connector having a receptacle connector housing having a mating interface, the receptacle connector including a receptacle connector communication device in the receptacle connector housing for wireless communication;
a photocontrol sensor connector having a sensor connector housing mated to the receptacle connector at the mating interface, the sensor connector having a photocontrol component for sensing an ambient light level exterior of the sensor connector, the sensor connector including an environmental sensor for sensing an environmental characteristic in the environment exterior of the sensor connector, the sensor connector including a sensor connector communication device in the sensor connector housing receiving signals from at least one of the photocontrol component and the environmental sensor, the sensor connector communication device wirelessly communicating control signals based on the received signals with the receptacle connector communication device across the mating interface;
a control circuit communicatively coupled to the receptacle connector communication device, the control circuit receiving the control signals from the receptacle connector communication device.

19. The light sensor assembly of claim 18, further comprising a power management circuit having a switch controlling a light of the light fixture, the control circuit sending control signals to the power management circuit for controlling the switch.

20. The light sensor assembly of claim 18, wherein the receptacle connector communication device receives control signals from the photocontrol sensor connector for controlling operation of the light fixture.

21. The light sensor assembly of claim 18, wherein the receptacle connector communication device receives control signals from a remote communication device for controlling operation of the light fixture.

* * * * *